UNITED STATES PATENT OFFICE.

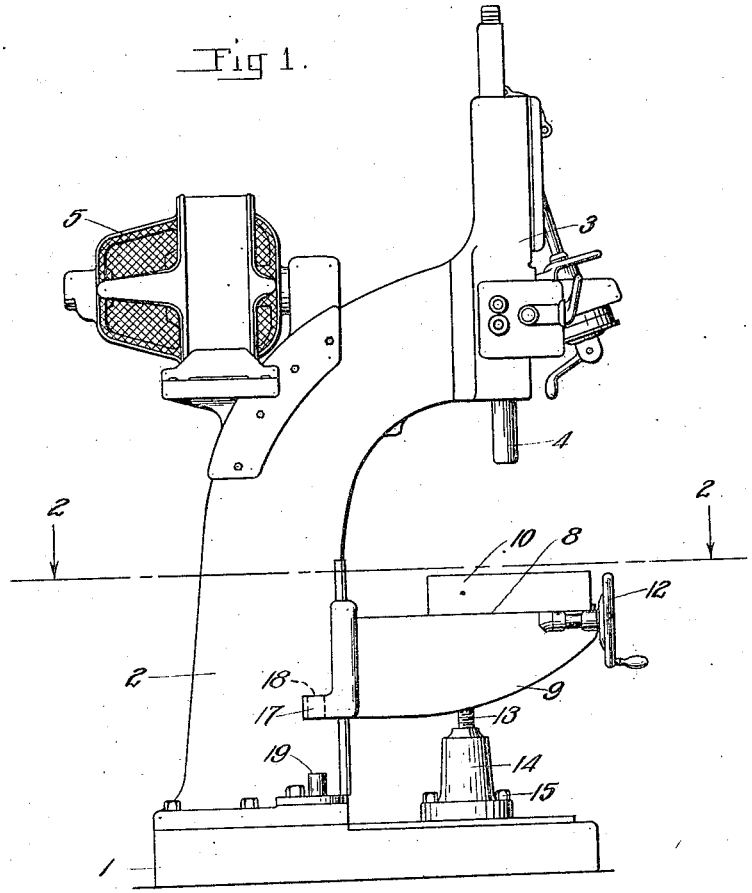
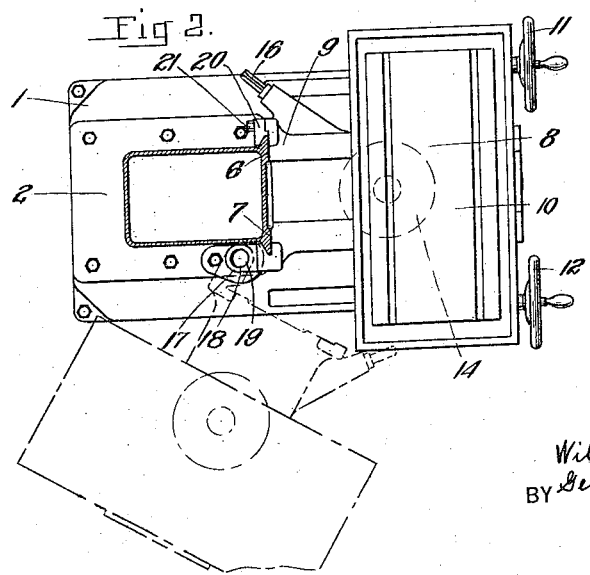

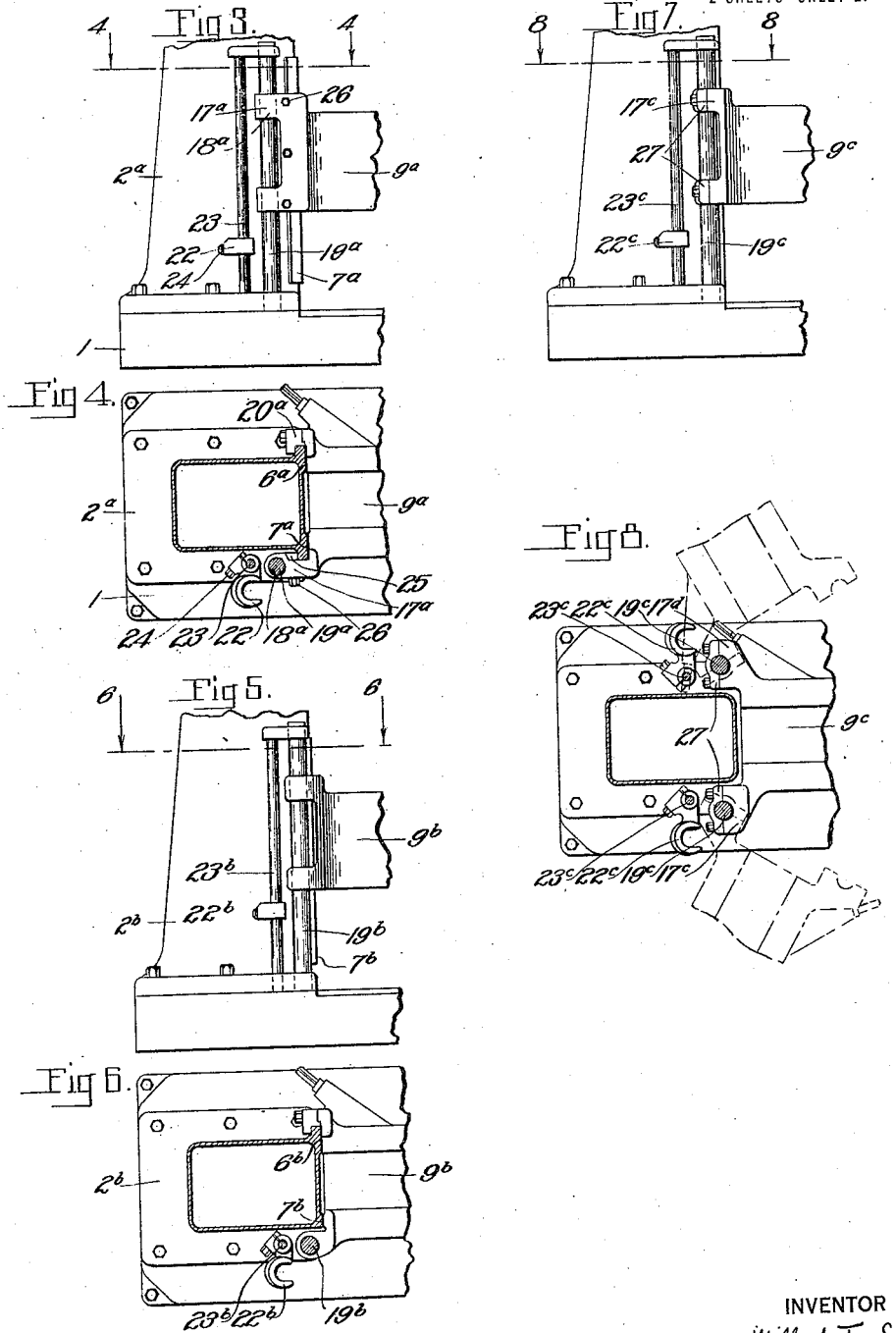

WILLARD T. SEARS, OF MONTCLAIR, AND GEORGE W. JAGER, OF BLOOMFIELD, NEW JERSEY, ASSIGNORS TO NILES-BEMENT-POND COMPANY, OF NEW YORK, N. Y., A CORPORATION OF NEW JERSEY.

DRILLING MACHINE.

1,414,486.      Specification of Letters Patent.      Patented May 2, 1922.

Application filed June 19, 1919. Serial No. 305,302.

*To all whom it may concern:*

Be it known that we, WILLARD T. SEARS and GEORGE W. JAGER, citizens of the United States, residing at Montclair, in the county of Essex and State of New Jersey, and at Bloomfield, in the county of Essex and State of New Jersey, respectively, have invented certain new and useful Improvements in Drilling Machines, of which the following is a specification.

The invention relates particularly to drilling machines of the class in which each has a vertical drill spindle rotatable about a fixed axis and a horizontal work-support for holding the work to be drilled.

The principal object of the invention is to provide in a drilling machine of the class specified, an improved construction whereby the work-support may be positioned beneath the drill spindle for supporting the work or may be moved in such a manner that the work may be supported directly upon the bed of the machine.

In the accompanying drawings we have shown several embodiments of the invention, but it will be understood that the construction of the machine may differ widely from that shown without departing from the present invention. The drawings are not to be construed as limiting or defining the scope of the invention, the accompanying claims being relied upon for that purpose.

Of the drawings:

Fig. 1 is a side view of a vertical drilling machine embodying the invention.

Fig. 2 is a sectional view through the line 2—2 of Fig. 1, indicating by dot-and-dash lines a position to which the work-support may be moved.

Fig. 3 is a fragmentary side view of a vertical drilling machine showing an alternate form of the invention.

Fig. 4 is a sectional view through the line 4—4 of Fig. 3.

Fig. 5 is a fragmentary side view of a vertical drilling machine showing another form of the invention.

Fig. 6 is a sectional view through the line 6—6 of Fig. 5.

Fig. 7 is a fragmentary side view of a vertical drilling machine illustrating still another form of the invention.

Fig. 8 is a sectional view through the line 8—8 of Fig. 7 indicating by dot-and-dash lines two positions to which the work-support may be moved.

Referring to Figs. 1 and 2 of the drawings, the frame of the machine comprises a bed 1 and a column 2 mounted thereon. Carried on the column is a head 3 in which is rotatably mounted a vertical spindle 4. A motor 5 is mounted on the column and, by means of suitable shafting and gears, drives the spindle. The power transmitting means for driving and feeding the spindle and the mechanism for the operation and control of the same may be in any usual or preferred form and hence a detailed description thereof is not included in this specification.

The column 2 is provided with guide means comprising two vertical guideways 6 and 7, shown as formed integrally, but as to the detailed construction of the guideways there may be variation within the scope of the invention. A work-support 8 is provided which is constructed in such a manner that its lower portion or carriage 9 will properly engage the said guideways to be vertically movable therealong. In addition to the carriage 9 the work-support preferably includes a table 10 which is horizontally movable on the carriage under the control of suitable hand wheels 11 and 12. For moving and controlling the carriage use is preferably made of the construction presented in the copending application of Willard T. Sears for drilling machines, Serial No. 313,905 filed July 28, 1919.

For transmitting the weight of the work-support and the work directly to the bed there is provided a vertical screw 13 which engages a nut in a bracket 14 secured to the bed by means of bolts 15. Suitable mechanism is provided for rotating the screw to raise or lower the work support and this preferably includes a horizontal shaft 16 having a squared end whereby it may be rotated. This mechanism is not shown in full as the details thereof are immaterial as concerns the present invention.

In accordance with the present invention, we provide means whereby the work-support may be swung away from the column and out of its normal operative position, which is shown in Fig. 1 and by full lines in Fig. 2 into the position shown by dot-and-dash lines in Fig. 2. This makes it possible for large pieces of work to be supported directly on the bed 1. For this purpose a pivot mechanism is provided, a simple form of which is shown in Figs. 1 and 2. As illustrated, there is a pivot element secured to or formed on the carriage and another secured to or formed on the frame near the base of the column. These pivot elements may be varied as to details, but preferably the element secured to the carriage comprises an ear 17 having a vertical cylindrical hole 18 therein. The other element mounted on the frame comprises a pivot pin 19 in alinement with the hole 18. When the work support is moved to its lowermost position, the two pivot elements are in engagement, the pin 19 being entered in the hole 18.

As illustrated in Fig. 2, the carriage is held in engagement with the guideways by means of a gib 20 secured in place by bolts 21. When the work-support is to be swung out of its normal operative position the gib 20 is removed and the bracket 14 is disconnected from the bed by removing the bolts 15. With the carriage in its lowermost position the screw 13 is turned sufficiently to raise the bracket 14 from the bed. Then the work-support can be swung about the axis of the pivot mechanism to the position shown by dotted lines in Fig. 2, the screw 13 and the bracket 14 moving with it. This permits large pieces of work to be supported directly on the bed in position to be engaged by the spindle 4. It will be observed that the guideways are entirely unobstructed except for the work-support and that the entire work-support swings away from the column, thus leaving a clear work space extending entirely to the guideways and the column.

Figs. 3 and 4 show an alternate construction in accordance with which the two elements of the pivot mechanism remain permanently in engagement instead of being separable, as shown in Figs. 1 and 2. As illustrated, there are two ears, $17^a$, $17^a$, secured to the carriage $9^a$, each ear having a vertical cylindrical hole $18^a$ which receives a vertical pivot pin $19^a$. This pin is suitably secured to the frame of the machine, preferably both at the top and at the bottom. For carrying the weight of the work-support when it is to be turned, we provide a suitable carrier which is adapted to engage the lower ear $17^a$ at points adjacent the pin $19^a$. Preferably, though not necessarily, the carrier is vertically adjustable so as to be adapted to hold the work-support at different elevations. As shown, the carrier is in the form of a U-shaped collar 22 which is pivotally mounted so that it can move into or out of position to engage the ear $17^a$. Preferably there is a vertical rod 23 mounted on the column $2^a$ parallel with the pivot pin $19^a$. The collar 22 is secured to this rod, preferably being vertically adjustable therealong and being adapted to be clamped thereto by means of a bolt 24. By turning the collar on the rod 23 or by turning the rod itself the collar can be moved into or out of position to engage the lower ear $17^a$. This construction makes it possible for the work support to be swung when at any elevation, and obviates the necessity of moving it to its lowermost position, as was described in connection with Figs. 1 and 2.

In Figs. 3 and 4 we have shown guideways $6^a$ and $7^a$ on the column $2^a$ which are somewhat different from the guideways 6 and 7 shown in Figs. 1 and 2. These guideways have parallel front and back surfaces and a gib $20^a$ is provided which is shaped to engage the edge and back surfaces of the guideway $6^a$. Adjacent the guideway $7^a$ there is provided a supplemental gib 25 which is held in place by bolts 26. When the table is to be swung it is necessary to remove not only the gib $20^a$ but also the gib 25.

Figs. 5 and 6 show a construction which is in many respects similar to that shown in Figs. 3 and 4. In this case, however, the column $2^b$ has but a single complete guideway $6^b$ formed directly thereon, having at the opposite side only a single guide surface $7^b$. For holding and guiding the carriage $9^b$ at this other side of the column, reliance is placed upon the vertical pin $19^b$ which is similar to the pin $19^a$ described in connection with Figs. 3 and 4. There is provided a carrier collar $22^b$ similar to the collar 22 already described and similarly mounted on a vertical rod $23^b$. It will be seen that the pin $19^b$ serves not only as a pivot pin but also as a guideway for the carriage.

Figs. 7 and 8 show a construction which is somewhat similar to that shown in Figs. 5 and 6, differing, however, in that there are two oppositely disposed vertical pins $19^c$, $19^c$ each of which serves as a guide means for the carriage $9^c$; there being in this case no guideways formed directly on the column $2^c$. Preferably the construction is such that either of the pins $19^c$ can be used as a pivot. The carriage is provided with four ears $17^c$, $17^c$ and $17^d$, $17^d$ which respectively engage the pins $19^c$, $19^c$ and which are held in place by means of caps 27, 27, 27, 27. At each side of the column there is a carrier collar $22^c$ and a vertical rod $23^c$ similar to the collars and rods before described. It will be seen that, by removing either pair of the caps 27, the work-support can be swung about the opposite pin, being carried by the corresponding collar $23^c$ as shown by the dot-and-dash lines in Fig. 8.

What we claim is:

1. The combination in a drilling machine, of a frame comprising a bed and a column, vertical guide means on the frame, a work-support having a guideway directly engaging and vertically adjustable along the guide means and guided thereby, means for adjusting the work support vertically, and means for pivoting the entire work-support, including its guideway away from the column in such a way as to enable the work to be supported on the bed instead of on the support, the work-support being guided and supported by the guide means and the adjusting means only when in direct engagement with the guide means.

2. The combination in a drilling machine, of a bed, a column on the bed, vertical guide means adjacent the column, a work-support directly engaging the guide means and vertically adjustable therealong, means for adjusting the work-support vertically the front of the column being unobstructed except for the said support, and means for pivotally holding the work-support so as to permit it to swing away from the front of the column thereby enabling the work to be supported on the bed instead of on the support and leaving a clear work space extending entirely to the front of the column.

3. The combination in a drilling machine, of a frame comprising a bed and a column, vertical guide means on the frame, a work-support vertically adjustable along the guide means and guided thereby, means for adjusting the work-support vertically and means including an element mounted on the frame independently of the guide means and of the adjusting means for pivotally holding the work-support so as to permit it to swing away from the column, thereby enabling work to be supported on the bed instead of on the support.

4. The combination in a drilling machine of a frame comprising a bed and a column, vertical guide means on the frame, a work-support adapted to engage the guide means and to be vertically adjusted therealong, means for adjusting the work-support vertically and means including an element mounted on the frame independently of the guide means for pivotally holding the work-support so as to permit it to swing away from the column, thereby enabling work to be supported on the bed instead of on the support.

5. The combination in a drilling machine of a frame comprising a bed and a column, vertical guide means on the frame, a work-support adapted to be vertically adjusted along the guide means and to be guided thereby, means for adjusting the work-support vertically and means including an element fixedly mounted on the frame for pivotally holding the work-support so as to permit it to swing away from the column, thereby enabling work to be supported on the bed instead of on the support.

6. The combination in a drilling machine of a frame comprising a bed and a column, vertical guide means on the frame, a work-support adapted to be vertically adjusted along the guide means, means for adjusting the work-support vertically and a vertical pivot pin on the frme with which the work-support has permanent sliding engagement, the support being adapted to swing on the pin away from the column, thereby enabling work to be supported on the bed instead of on the support.

7. The combination in a drilling machine, of a frame comprising a bed and a column, vertical guide means on the frame, a work-support vertically adjustable along the guide means, means for adjusting the work-support vertically, a vertical pivot pin on the frame with which the work-support has permanent sliding engagement, and a carrier on the frame adapted to engage the support and permit it to swing about the pin.

8. The combination in a drilling machine, of a frame comprising a bed and a column, vertical guide means on the frame, a work-support vertically adjustable along the guide means and guided thereby, a vertical pivot pin on the frame with which the work-support has permanent sliding engagement, and a vertically adjustable carrier on the frame adapted to engage the support at different elevations and permit it to swing about the pin.

9. The combination in a drilling machine, of a frame comprising a bed and a column, vertical guide means on the frame, a work-support adapted to be vertically adjusted along the guide means and guided thereby, means for adjusting the work-support vertically, a vertical pivot pin on the frame with which the work-support has permanent sliding engagement, and a collar pivotally mounted on the frame for movement into or out of table-engaging position and in such position permitting the table to swing about the pin.

10. The combination in a drilling machine, of a frame comprising a bed and a column, vertical guide means on the frame, a work-support adapted to be vertically adjusted along the guide means and guided thereby, a vertical pivot pin on the frame with which the work-supoprt has permanent sliding engagement, and a vertically adjustable collar pivotally mounted on the frame for movement into or out of work-support engaging position, the collar being adapted to engage the support at different elevations and permit it to swing about the pin.

11. The combination in a drilling machine, of a frame comprising a bed and a column, guideways on the frame including a vertical pivot pin rigid with the frame, a work-support vertically adjustable along the guideways and guided thereby, and means for adjusting the work-support vertically the work-support being adapted to swing on the pin away from the column.

12. The combination in a drilling machine, of a frame comprising a bed and a vertical column, guideways on the frame including two vertical pins adjacent the column, a work-support vertically adjustable along the guideways and guided thereby, and means for adjusting the work-support vertically the work-support being adapted to swing on one of the said pins away from the column.

13. The combination in a drilling machine, of a frame comprising a bed and a vertical column, guideways on the frame including two vertical pins adjacent the column, a work-support vertically adjustable along the guideways and guided thereby, and means for adjusting the work-support vertically the work-support being adapted to swing on either of the said pins away from the column.

14. The combination in a drilling machine, of a frame comprising a bed and a vertical column, guideways on the frame including two vertical pins adjacent the column, a work-support vertically adjustable along the guideways and guided thereby, and two vertically adjustable carriers on the frame, each adapted to engage the support and permit it to swing about the corresponding pin.

In testimony whereof, we hereto affix our signatures.

WILLARD T. SEARS.
GEORGE W. JAGER.